(12) United States Patent
Hsia

(10) Patent No.: US 11,122,658 B2
(45) Date of Patent: Sep. 14, 2021

(54) SOLID-STATE LIGHTING WITH REMOTE TUNING AND DIMMING

(71) Applicant: Aleddra Inc., Renton, WA (US)

(72) Inventor: Chungho Hsia, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 0 days.

(21) Appl. No.: 16/989,016

(22) Filed: Aug. 10, 2020

(65) Prior Publication Data
US 2020/0374999 A1 Nov. 26, 2020

Related U.S. Application Data

(63) Continuation-in-part of application No. 16/929,540, filed on Jul. 15, 2020, which is a continuation-in-part of application No. 16/904,206, filed on Jun. 17, 2020, which is a continuation-in-part of application No. 16/880,375, filed on May 21, 2020, which is a continuation-in-part of application No. 16/861,137, filed on Apr. 28, 2020, now Pat. No. 10,992,161, which is a continuation-in-part of application No. 16/830,198, filed on Mar. 25, 2020, now Pat. No.
(Continued)

(51) Int. Cl.
| | | |
|---|---|---|
| *H05B 39/04* | (2006.01) | |
| *H05B 45/325* | (2020.01) | |
| *H05B 47/175* | (2020.01) | |
| *H05B 45/22* | (2020.01) | |
| *H05B 45/395* | (2020.01) | |

(52) U.S. Cl.
CPC .......... *H05B 45/325* (2020.01); *H05B 45/22* (2020.01); *H05B 45/395* (2020.01); *H05B 47/175* (2020.01)

(58) Field of Classification Search
CPC .. H02J 2207/20; H02J 7/04; H02J 7/00; H02J 7/0031; H02J 7/0048; H02J 7/0068; H02J 7/00714; H02J 9/065; H02J 7/06; H02J 7/0072; H05B 45/37; H05B 45/382; H05B 45/30; H05B 45/31; H05B 45/325; H05B 47/19; Y02B 20/30; Y02B 20/40; Y02B 20/00; Y02B 70/10; F21S 9/022; F21Y 2115/10
See application file for complete search history.

(56) References Cited

U.S. PATENT DOCUMENTS

| | | | | |
|---|---|---|---|---|
| 2010/0084985 A1* | 4/2010 | Woytowitz | ............. | H05B 31/50 |
| | | | | 315/210 |
| 2013/0147376 A1* | 6/2013 | Trainor | ................... | H02J 9/065 |
| | | | | 315/200 R |
| 2015/0208469 A1* | 7/2015 | Coetzee | ............. | H02M 3/1582 |
| | | | | 315/307 |

* cited by examiner

*Primary Examiner* — William J Carter
*Assistant Examiner* — Omar Rojas Cadima
(74) *Attorney, Agent, or Firm* — Han IP PLLC; Andy M. Han

(57) ABSTRACT

A light-emitting diode (LED) luminaire comprising LED arrays, a transceiver circuit, a voltage converter circuit, and a control circuit is adopted to convert remote control signals into PWM signals to operate the voltage converter circuit, controlling luminous intensity and color temperature of the LED luminaire. The LED luminaire further comprises a remote controller. When the remote control signals are initiated by the remote controller with phase-shift keying (PSK) signals transmitted, the transceiver circuit can demodulate such PSK signals and subsequently send the PWM signals responsive to decoded commands to control the voltage converter circuit to turn the LED arrays on and off, to tune the LED arrays up and down, and to dim the LED arrays up and down.

18 Claims, 4 Drawing Sheets

Related U.S. Application Data 10,869,373, which is a continuation-in-part of application No. 16/735,410, filed on Jan. 6, 2020, now Pat. No. 10,660,179, which is a continuation-in-part of application No. 16/694,970, filed on Nov. 25, 2019, now Pat. No. 10,602,597, which is a continuation-in-part of application No. 16/681,740, filed on Nov. 12, 2019, now Pat. No. 10,959,310, which is a continuation-in-part of application No. 16/664,034, filed on Oct. 25, 2019, now Pat. No. 10,660,184, which is a continuation-in-part of application No. 16/572,040, filed on Sep. 16, 2019, now Pat. No. 10,645,782, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

SOLID-STATE LIGHTING WITH REMOTE TUNING AND DIMMING

CROSS-REFERENCE TO RELATED APPLICATIONS

The present disclosure is part of a continuation-in-part (CIP) application of U.S. patent application Ser. No. 16/929,540, filed 15 Jul. 2020, which is part of CIP application of U.S. patent application Ser. No. 16/904,206, filed 17 Jun. 2020, which is part of CIP application of U.S. patent application Ser. No. 16/880,375, filed 21 May 2020, which is part of CIP application of U.S. patent application Ser. No. 16/861,137, filed 28 Apr. 2020, which is part of CIP application of U.S. patent application Ser. No. 16/830,198, filed 25 Mar. 2020, which is part of CIP application of U.S. patent application Ser. No. 16/735,410, filed 6 Jan. 2020 and issued as U.S. Pat. No. 10,660,179 on 19 May 2020, which is part of CIP application of U.S. patent application Ser. No. 16/694,970, filed 25 Nov. 2019 and issued as U.S. Pat. No. 10,602,597 on 24 Mar. 2020, which is part of CIP application of U.S. patent application Ser. No. 16/681,740, filed 12 Nov. 2019, which is part of CIP application of U.S. patent application Ser. No. 16/664,034, filed 25 Oct. 2019 and issued as U.S. Pat. No. 10,660,184 on 19 May 2020, which is part of CIP application of U.S. patent application Ser. No. 16/572,040, filed 16 Sep. 2019 and issued as U.S. Pat. No. 10,645,782 on 5 May 2020, which is part of CIP application of U.S. patent application Ser. No. 16/547,502, filed 21 Aug. 2019 and issued as U.S. Pat. No. 10,485,073 on 19 Nov. 2019, which is part of CIP application of U.S. patent application Ser. No. 16/530,747, filed 2 Aug. 2019 and issued as U.S. Pat. No. 10,492,265 on 26 Nov. 2019, which is part of CIP application of U.S. patent application Ser. No. 16/458,823, filed 1 Jul. 2019 and issued as U.S. Pat. No. 10,485,065 on 10 Nov. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) luminaire, and more particularly to an LED luminaire with remote tuning and dimming.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an alternate-current (AC) mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

The AC mains-operable LED luminaires can easily be used with a remote lighting control system, taking advantages of no rewiring needed for remote control. No wiring or rewiring can save dramatic installation cost, and such a lighting is free of the wiring errors in contrast to an all wired system that is highly susceptible to such errors. With the acceleration of LED luminaire deployment in the lighting industry, the needs of energy saving, utilization efficiency of lighting energy, and intelligent control of lighting have become very urgent. Traditional wired luminaire controls have drawbacks such as only on-off for manual switch control, susceptibility of the interference by the strong magnetic field from a power line for power carrier control, and failing to meet the requirements of centralized monitoring, recording, and energy management. On the other hand, the lighting industry needs control systems that can not only turn on and off but also dim up and down and tune up and down an LED luminaire. It is, therefore, a motive to design such an LED luminaire incorporating a cost-effective remote control that is simple to implement without commissioning in the field and without wiring and rewiring.

SUMMARY

An integrated LED luminaire comprises a plurality of LED arrays comprising a first set of one or more LED arrays comprising a first positive potential terminal and a first negative potential terminal with a first forward voltage across thereof. The LED luminaire further comprises a power converter circuit with two electrical conductors "L" and "N" and a first voltage converter circuit. The two electrical conductors "L" and "N" are configured to couple to the AC mains. The power converter circuit comprises a first rectifier diode and is configured to couple to the two electrical conductors "L" and "N" to convert a line voltage from the AC mains into a first direct-current (DC) voltage via the first rectifier diode. The first voltage converter circuit is configured to down-convert the first DC voltage into a second DC voltage. Both the first DC voltage and the second DC voltage are with respect to a first ground reference. The LED luminaire further comprises a first control circuit comprising a photo-coupler circuit configured to receive a first pulse-width modulation (PWM) signal and to control a first LED driving current driving the first set of one or more LED arrays. The photo-coupler circuit comprises an LED and a photo-transistor. The LED is configured to emit a light signal responsive to the first PWM signal whereas the photo-transistor is configured to enable the first voltage converter circuit responsive to the light signal. The LED luminaire further comprises a transceiver circuit comprising a receiver and a decoder and controller. The transceiver circuit is coupled to the first control circuit and configured to receive and demodulate various phase-shift keying (PSK) band-pass signals and to output the first PWM signal.

The first positive potential terminal is coupled to the first DC voltage with the first negative potential terminal coupled to the second DC voltage. The first control circuit further comprises a first electronic switch controlled by the first DC voltage and configured to couple to the first set of one or more LED arrays. When the second DC voltage is built up to a predetermined level, the first LED driving current is allowed to pass through the first electronic switch, thereby lighting up the first set of one or more LED arrays. The first control circuit further comprises a bias circuit configured to ensure that the first PWM signal operates the first electronic switch with the first LED driving current to drive the first set of one or more LED arrays.

The plurality of LED arrays further comprises a second set of one or more LED arrays comprising a second positive potential terminal and a second negative potential terminal with a second forward voltage across thereof. The second set of one or more LED arrays is coupled to the first DC voltage at the second positive potential terminal and coupled to the second DC voltage at the second negative potential terminal. The first control circuit further comprises a second electronic switch controlled by the first DC voltage and coupled to the second negative potential terminal. When the second DC voltage is built up to the predetermined level, a second LED driving current is allowed to pass through the second electronic switch, thereby lighting up the second set of one or more LED arrays.

The transceiver circuit is further configured to output a second PWM signal. The second PWM signal is coupled to the first voltage converter circuit and configured to control a total current allowed to flow from the first DC voltage to the second DC voltage, further down to the first ground reference, completing a power transfer to both the first set of one or more LED arrays and the second set of one or more LED array. In this case, a sum of the first LED driving current and the second LED driving current equals the total current. The first set of one or more LED arrays and the second set of one or more LED arrays may respectively comprise a plurality of cool-white LEDs and a plurality of warm-white LEDs. The plurality of cool-white LEDs may comprise a plurality of LEDs that have a correlated color temperature (CCT) of 5000-6000 K (Kelvin degrees). The plurality of warm-white LEDs may comprise a plurality of LEDs that have a CCT of 2700-3500 K. In this case, a ratio of the first LED driving current to the second LED driving current determines a CCT of luminous flux (or luminous intensity) emitted from the LED luminaire. This means that the CCT can be tuned up when the first LED driving current is increased whereas the second LED driving current is relatively decreased. Similarly, the CCT can be tuned down when the first LED driving current is decreased whereas the second LED driving current is relatively increased. In other words, the CCT tuning can be achieved by using the first voltage converter circuit that has a feature of providing a constant current whereas the second PWM signal is served as a control voltage to the first voltage converter circuit. In that sense, the first voltage converter circuit is served as a voltage-controlled current source.

The power converter circuit further comprises a second voltage converter circuit and a transformer comprising a primary winding and a secondary winding. The transformer further comprises a second ground reference configured to isolate from the first ground reference. The secondary winding comprises a tap, a second rectifier diode, and a capacitor. The second rectifier diode is coupled to the tap and configured to convert energy pulses generated in the transformer into a third DC voltage. The second voltage converter circuit comprises a regulator and a low-dropout (LDO) regulator. The LDO regulator is coupled to receive the third DC voltage and configured to convert the third DC voltage into a fourth DC voltage to power up the transceiver circuit. The LDO regulator is a DC linear voltage regulator that can regulate the output voltage even when a supply voltage is close to an output voltage. The advantages of the LDO regulator over DC-to-DC regulators are free of switching noises, simple, small size, etc.

The first voltage converter circuit comprises an inductor, a second control circuit, and a third electronic switch controlled by the second control circuit. The first voltage converter circuit is configured to regulate the total current allowed to flow from the first DC voltage to the second DC voltage and to continue to reach the first ground reference. The second control circuit is controlled by the second PWM signal to turn on and off the third electronic switch. The first voltage converter circuit further comprises an output capacitor and a diode coupled to the inductor with a diode current direction toward the first DC voltage. The output capacitor is configured to build up an output voltage to partly provide energy to both the first set of one or more LED arrays and the second set of one or more LED arrays and to operate thereof. Back in FIG. 1, the first control circuit further comprises a resistor coupled to the first DC voltage and configured to charge the inductor in a start-up process. When the third electronic switch is turned off, the inductor 401 that is already charged reverses its polarity to conduct the diode such that energy stored in the inductor can be released to sustain a discharging current from the inductor to both the first set of one or more LED arrays and the second set of one or more LED arrays, operating thereof.

The first voltage converter circuit is further configured to adjust the second DC voltage and to drive both the first set of one or more LED arrays and the second set of one or more LED arrays. When the third electronic switch is turned off, the discharging current from the inductor goes to zero at an end of an off-time. Responsive to detecting zero current in the inductor, the second control circuit generates a zero current detection signal to control the third electronic switch on and off with a constant on-time and a varied off-time with a duty cycle controlling both the first LED driving current and the second LED driving current to respectively drive the first set of one or more LED arrays and the second set of one or more LED arrays. Tracking voltage variations over switching cycles ensures that the total current is maintained in a constant level.

The remote controller comprises a remote user interface and a transmitter circuit. The remote controller is configured to send the PSK band-pass signals to the transceiver circuit in response to a plurality of signals generated from the remote user interface. The transmitter circuit comprises an encoder and controller and a transmitter. The encoder and controller is coupled between the remote user interface and the transmitter and configured to convert the plurality of signals into a plurality of sets of binary data characters. Each of the plurality of sets of binary data characters comprises command data.

The remote user interface comprises a plurality of touch-sensitive switches, which are configured to provide the plurality of signals. Each of the touch-sensitive switches comprises an input and an output respectively configured to receive a voltage and to send a pulse signal from and to the encoder and controller when an associated touch-sensitive switch is touched. For example, one of the touch-sensitive switches comprises the input and the output. The input is configured to receive a voltage from the encoder and controller. When touched, the touch-sensitive switch sends a pulse signal to the encoder and controller. The encoder and controller is configured to monitor the pulse signal and to respond accordingly by sending out one of the PSK band-pass signals. At least two of the plurality of signals are respectively configured to turn on and off the second DC voltage and subsequently both the first set of one or more LED arrays and the second set of one or more LED arrays. At least two of the plurality of signals are respectively configured to dim up and dim down both the first set of one or more LED arrays and the second set of one or more LED arrays. At least two of the plurality of signals are respectively configured to increase and to decrease the CCT of the LED luminaire by tuning up and down the CCT.

The transmitter may comprise a mixer, a front-end transmitter/receiver, an antenna embedded on a PCB, and two or more inductors. The mixer is configured to modulate the plurality of sets of binary data characters onto a carrier wave with a carrier phase shifted by 180 degrees whenever a binary data character "0" is transmitted. It should be appreciated that PSK signaling outperforming amplitude-shift keying (ASK) and frequency-shift keying (FSK) can be found in Digital Communication Theory. Owing to simplicity and reduced error probability, the PSK signaling is widely used in wireless local area network (LAN) standard, IEEE 802.11 and IEEE 802.15 using two frequency bands: at 868-915 MHz with binary PSK (BPSK) and at 2.4 GHz with offset quadrature PSK (OQPSK). Various applications in such two frequency bands include ones adopting protocols of Zigbee and Bluetooth for lighting controls.

In this disclosure, the LED luminaire may be adopted to couple to various LED luminaires such as high-power UFO lighting fixtures over 100 watts, sport lighting fixtures over 200 watts, low-power panel lights under 50 watts, LED lamps under 20 watts, etc. with the remote controller to control such LED luminaires to work in controllable on-off, dimming up and down, and tuning up and down environments without wiring and rewiring.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a "first", a "second", a "third", and so forth does not necessarily represent a part that is mentioned in an ordinal manner, but a particular one.

DETAILED DESCRIPTION OF THE INVENTION

Figure 1:
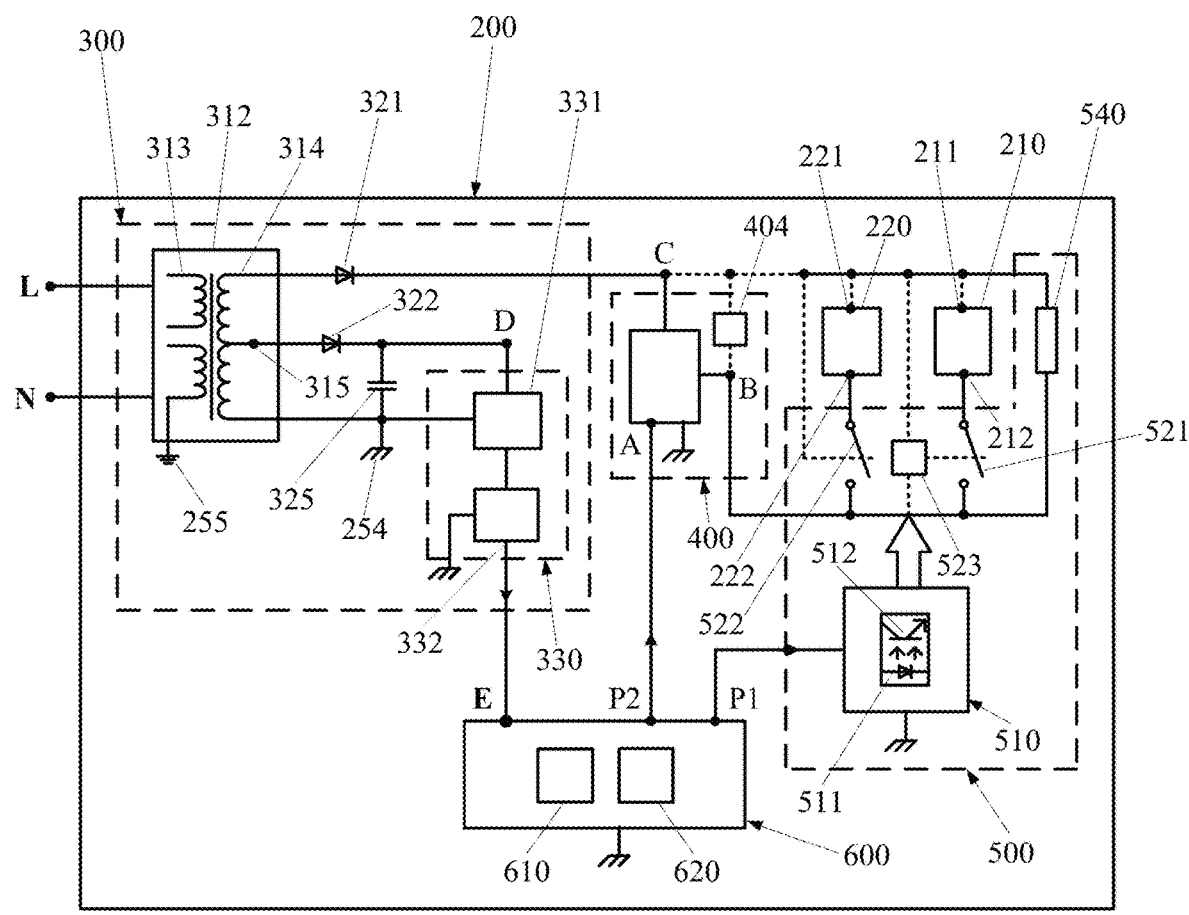
FIG. 1 is a block diagram of an LED luminaire according to the present disclosure.

FIG. 1 is a block diagram of an LED luminaire according to the present disclosure. In FIG. 1, the integrated LED luminaire 200 comprises a plurality of LED arrays comprising a first set of one or more LED arrays 210 comprising a first positive potential terminal 211 and a first negative potential terminal 212 with a first forward voltage across thereof. The LED luminaire 200 further comprises a power converter circuit 300 with two electrical conductors "L" and "N" and a first voltage converter circuit 400. The two electrical conductors "L" and "N" are configured to couple to the AC mains. The power converter circuit 300 comprises a first rectifier diode 321 and is configured to couple to the two electrical conductors "L" and "N" to convert a line voltage from the AC mains into a first direct-current (DC) voltage via the first rectifier diode 321 at a port "C". The first voltage converter circuit 400 is configured to down-convert the first DC voltage into a second DC voltage at a port "B". Both the first DC voltage and the second DC voltage are with respect to a first ground reference 254. The LED luminaire 200 further comprises a first control circuit 500 comprising a photo-coupler circuit 510 configured to receive a first pulse-width modulation (PWM) signal from a port "P1" and to control a first LED driving current driving the first set of one or more LED arrays 210. The photo-coupler circuit 510 comprises an LED 511 and a photo-transistor 512. The LED 511 is configured to emit a light signal responsive to the first PWM signal whereas the photo-transistor 512 is configured to enable the first voltage converter circuit 400 responsive to the light signal. In FIG. 1, the LED luminaire 200 further comprises a transceiver circuit 600 comprising a receiver 610 and a decoder and controller 620. The transceiver circuit 600 is coupled to the first control circuit 500 via the port "P1" and configured to receive and demodulate various phase-shift keying (PSK) band-pass signals and to output the first PWM signal. The decoder and controller 620 comprises a microcontroller, a microchip, or a programmable logic controller.

In FIG. 1, the positive potential terminal 211 is coupled to the first DC voltage with the negative potential terminal 212 coupled to the second DC voltage. The first control circuit 500 further comprises a first electronic switch 521 controlled by the first DC voltage and configured to couple to the first set of one or more LED arrays 210. When the second DC voltage is built up to a predetermined level, the first LED driving current is allowed to pass through the first electronic switch 521, thereby lighting up the first set of one or more LED arrays 210. The first control circuit 500 further comprises a bias circuit 523 configured to ensure that the first PWM signal operates the first electronic switch 521 with the first LED driving current to drive the first set of one or more LED arrays 210.

In FIG. 1, the plurality of LED arrays further comprises a second set of one or more LED arrays 220 comprising a second positive potential terminal 221 and a second negative potential terminal 222 with a second forward voltage across thereof. The second set of one or more LED arrays 220 is coupled to the first DC voltage at the second positive potential terminal 221 and coupled to the second DC voltage at the second negative potential terminal 222. The first control circuit 500 further comprises a second electronic switch 522 controlled by the first DC voltage and coupled to the second negative potential terminal 222. When the second DC voltage is built up to the predetermined level, a second LED driving current is allowed to pass through the second electronic switch 522, thereby lighting up the second set of one or more LED arrays 220.

The transceiver circuit 600 is further configured to output a second PWM signal via a port "P2". The second PWM signal is coupled to the first voltage converter circuit 400 via a port "A" and configured to control a total current allowed to flow from the first DC voltage to the second DC voltage and continue to reach the first ground reference 254, completing a power transfer to both the first set of one or more LED arrays 210 and the second set of one or more LED arrays 220. A sum of the first LED driving current and the second LED driving current equals the total current. The first set of one or more LED arrays 210 and the second set of one or more LED arrays 220 may respectively comprise a plurality of cool-white LEDs and a plurality of warm-white LEDs. The plurality of cool-white LEDs may comprise a plurality of LEDs that have a correlated color temperature (CCT) of 5000-6000 K (Kelvin degrees). The plurality of warm-white LEDs may comprise a plurality of LEDs that have a CCT of 2700-3500 K. In this case, a ratio of the first LED driving current to the second LED driving current determines a CCT of luminous flux (or luminous intensity) emitted from the LED luminaire 200. This means that the CCT can be tuned up when the first LED driving current is increased whereas the second LED driving current is relatively decreased. Similarly, the CCT can be tuned down when the first LED driving current is decreased whereas the second LED driving current is relatively increased. In other words, the CCT tuning can be achieved by using the first voltage converter circuit 400 that has a feature of providing a constant current whereas the second PWM signal is served as a control voltage to the first voltage converter circuit 400. In this sense, the first voltage converter circuit 400 is served as a voltage-controlled current source.

In FIG. 1, the power converter circuit 300 further comprises a second voltage converter circuit 330 and a transformer 312 comprising a primary winding 313 and a secondary winding 314. The transformer 312 further comprises a second ground reference 255 configured to isolate from the first ground reference 254. The secondary winding 314 comprises a tap 315, a second rectifier diode 322, and a capacitor 325. The second rectifier diode 322 is coupled to the tap 315 and configured to convert energy pulses generated in the transformer into a third DC voltage. The second voltage converter circuit 330 comprises a regulator 331 and a low-dropout (LDO) regulator 332. The LDO regulator 332 is coupled to receive the third DC voltage via a port "D" and configured to convert the third DC voltage into a fourth DC voltage to power up the transceiver circuit 600 via a port "E". The LDO regulator 332 is a DC linear voltage regulator that can regulate the output voltage even when a supply voltage is close to an output voltage. The advantages of the LDO regulator 332 over DC-to-DC regulators are free of switching noises, simple, small size, etc.

Figure 2:
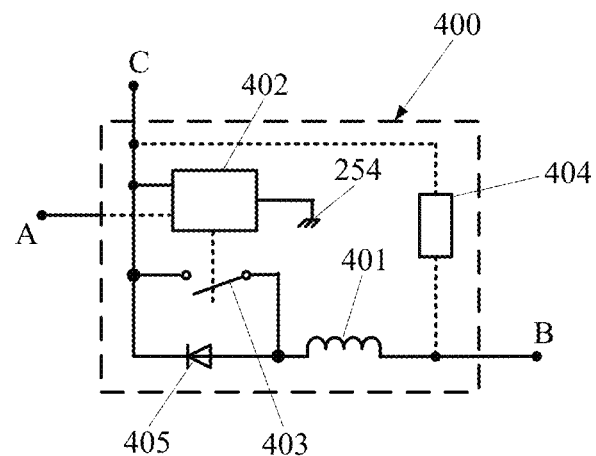
FIG. 2 is a block diagram of a first voltage converter circuit according to the present disclosure.

FIG. 2 is a block diagram of a voltage converter circuit according to the present disclosure. In FIG. 2, the first voltage converter circuit 400 comprises an inductor 401, a second control circuit 402, and a third electronic switch 403 controlled by the second control circuit 402. The first voltage converter circuit 400 is configured to regulate the total current allowed to flow from the first DC voltage to the second DC voltage and to continue to reach the first ground reference 254. The second PWM signal is coupled to the second control circuit 402 via the port "A" to turn on and off the third electronic switch 403. The first voltage converter circuit 400 further comprises an output capacitor 404 coupled between the port "C" and the port "B" and a diode 405 coupled to the inductor 401 with a diode current direction toward the first DC voltage (i.e. the port "C"). The output capacitor 404 is configured to build up an output voltage to partly provide energy to both the first set of one or more LED arrays 210 and the second set of one or more LED arrays 220 and to operate thereof. Back in FIG. 1, the first control circuit 500 further comprises a resistor 540 coupled to the first DC voltage and configured to charge the inductor 401 in a start-up process. When the third electronic switch 403 is turned off, the inductor 401 that is already charged reverses its polarity to conduct the diode 405 such that energy stored in the inductor 401 can be released to sustain a discharging current from the inductor 401 to both the first set of one or more LED arrays 210 and the second set of one or more LED arrays 220, operating thereof. The first electronic switch 521, the second electronic switch 522, and the third electronic switch 403 comprise a metal-oxide-semiconductor field-effect transistor (MOSFET).

The first voltage converter circuit 400 is further configured to adjust the second DC voltage and to drive both the first set of one or more LED arrays 210 and the second set of one or more LED arrays 220. When the third electronic switch 403 is turned off, the discharging current from the inductor 401 goes to zero at the end of an off-period. Responsive to detecting zero current in the inductor 401, the second control circuit 402 generates a zero current detection signal to control the third electronic switch 403 on and off with a constant on-time and a varied off-time with a duty cycle controlling both the first LED driving current and the second LED driving current to respectively drive the first set of one or more LED arrays 210 and the second set of one or more LED arrays 220. Tracking voltage variations over switching cycles ensures that the total current is maintained in a constant level.

Figure 3:
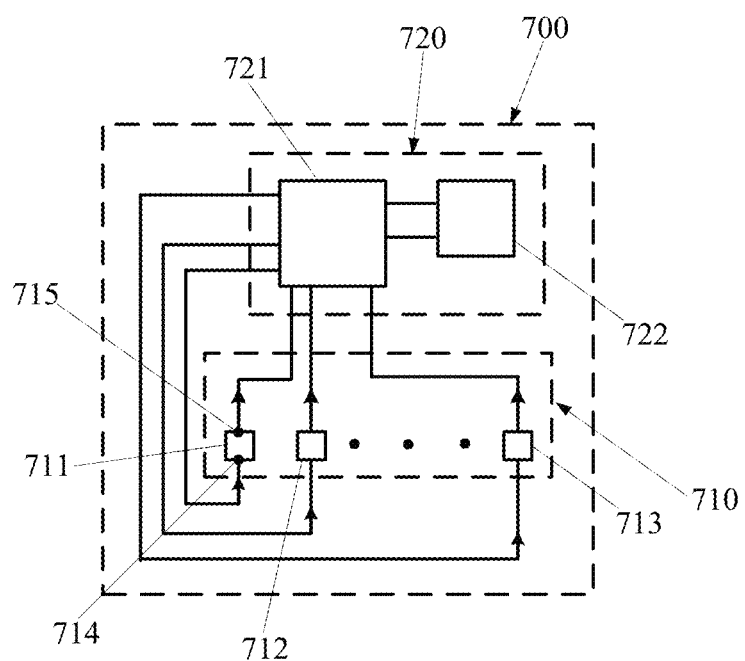
FIG. 3 is a block diagram of a remote controller according to the present disclosure.

FIG. 3 is a block diagram of a remote controller according to the present disclosure. In FIG. 3, the remote controller 700 comprises a remote user interface 710 and a transmitter circuit 720. The remote controller 700 is configured to send the PSK band-pass signals to the transceiver circuit 600 in response to a plurality of signals generated from the remote user interface 710. The transmitter circuit 720 comprises an encoder and controller 721 and a transmitter 722. The encoder and controller 721 is coupled between the remote user interface 710 and the transmitter 722 and configured to convert the plurality of signals into a plurality of sets of binary data characters. Each of the plurality of sets of binary data characters comprises command data.

In FIG. 3, the remote user interface 710 comprises a plurality of touch-sensitive switches 711, 712, and 713, which are configured to provide the plurality of signals. Three dots represent more of such touch-sensitive switches are used. Each of the touch-sensitive switches comprises an input and an output respectively configured to receive a voltage and to send a pulse signal from and to the encoder and controller when an associated touch-sensitive switch is touched. For example, one of the touch-sensitive switches 711 comprises the input 714 and the output 715. The input 714 is configured to receive a voltage from the encoder and controller 721. When touched, the touch-sensitive switch 711 sends a pulse signal to the encoder and controller 721. The encoder and controller 721 is configured to monitor the pulse signal and to respond accordingly by sending out one of the PSK band-pass signals. At least two of the plurality of signals are respectively configured to turn on and off the second DC voltage, subsequently turning on and off both the first set of one or more LED arrays 210 and the second set of one or more LED arrays 220. At least two of the plurality of signals are respectively configured to dim up and dim down both the first set of one or more LED arrays 210 and the second set of one or more LED arrays 220. At least two of the plurality of signals are respectively configured to increase and to decrease the CCT of the LED luminaire by tuning up and down the CCT.

Figure 4:
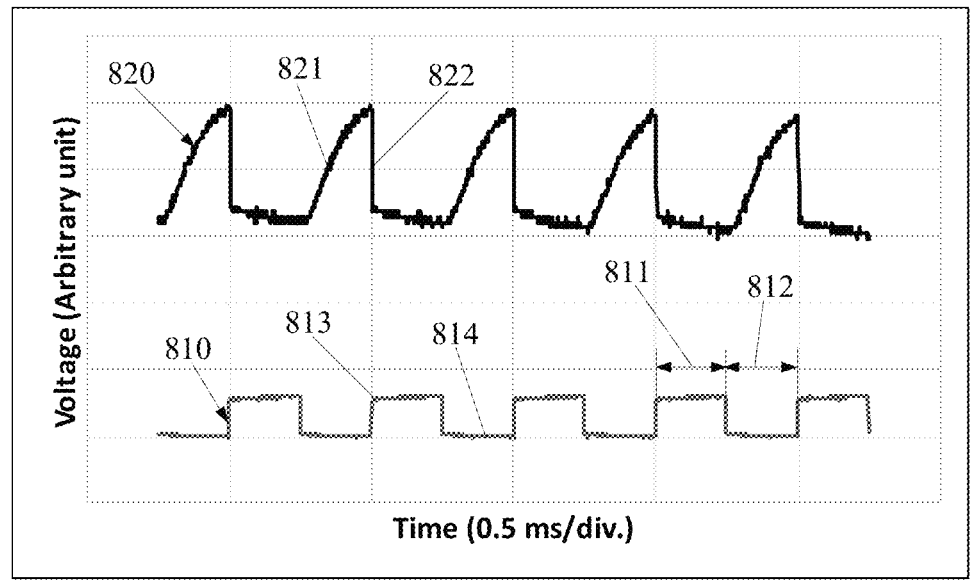
FIG. 4 is an example of a first PWM signal and an output voltage waveform according to the present disclosure.

FIG. 4 is an example of a first PWM signal and an output voltage waveform according to the present disclosure. In FIG. 4, the first PWM signal 810 comprises multiple pulses with an amplitude 813 representing a high level "1" and a zero amplitude 814 representing a low level "0". The amplitude 813 comprises an on-period 811 of 0.25 milliseconds (ms) whereas the zero amplitude 814 comprises an off-period 812 of 0.25 ms, corresponding to a PWM frequency of 2 kHz. In this case, a duty cycle is around 50%. An output voltage versus time from the photo-transistor 512 (FIG. 1) is shown in a waveform 820. As can be seen, the waveform 820 comprises multiple pulses, each with a rising portion 821 and a falling portion 822 in response to a pulse train of the first PWM signal 810. In the rising portion 821, the first voltage converter circuit 400 is off whereas in the falling portion 822, the first voltage converter circuit 400 is on. Depending on the duty cycle of 50%, the first voltage converter circuit 400 provides the first LED driving current to drive the first set of one or more LED arrays 210.

Figure 5:
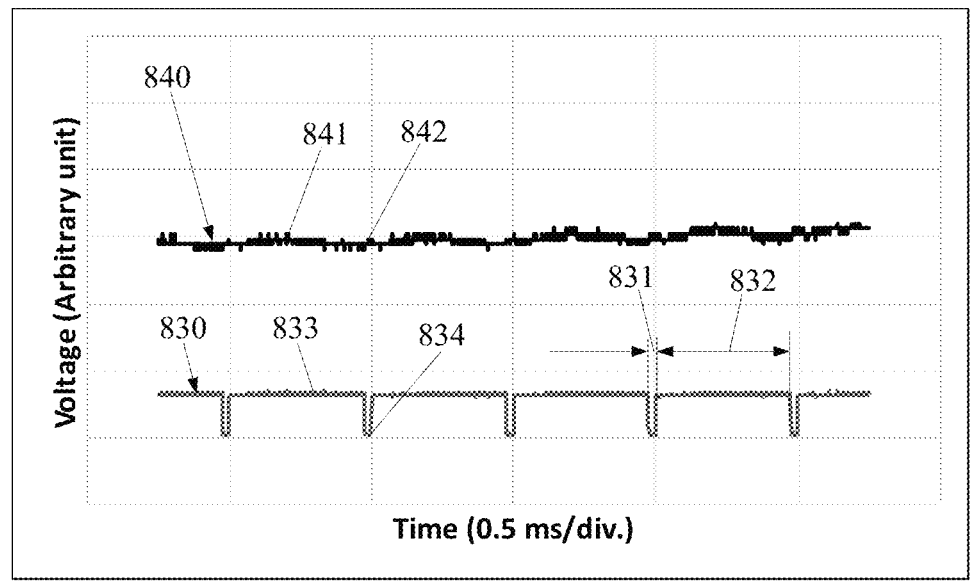
FIG. 5 is an example of a second PWM signal and an output voltage waveform according to the present disclosure.

FIG. 5 is an example of a second PWM signal and an output voltage waveform according to the present disclosure. In FIG. 5, the second PWM signal 830 comprises multiple pulses with an amplitude 833 representing a high level "1" and a zero amplitude 834 representing a low level "0". The amplitude 833 comprises an on-period 832 of 0.475 ms whereas the zero amplitude 834 comprises an off-period 831 of 0.025 ms, corresponding to a PWM frequency of 2 kHz. In this case, a duty cycle is around 93%. An output voltage versus time from the photo-transistor 512 (FIG. 1) is shown in a waveform 840. As can be seen, the waveform 840 comprises multiple pulses, each with a rising portion 841 and a falling portion 842 in response to a pulse train of the second PWM signal 830. No matter whether in the rising portion 841 or in the falling portion 842, the waveform 840 basically maintains in a first voltage level that is low enough to allow the first voltage converter circuit 400 to operate because a difference of the first DC voltage and the first voltage level is greater than either the first forward voltage or the second forward voltage. Depending on the duty cycle of 93%, the first voltage converter circuit 400 provides the total current (depicted in FIG. 1) to drive both the first set of one or more LED arrays 210 and the second set of one or more LED arrays 220.

Figure 6:
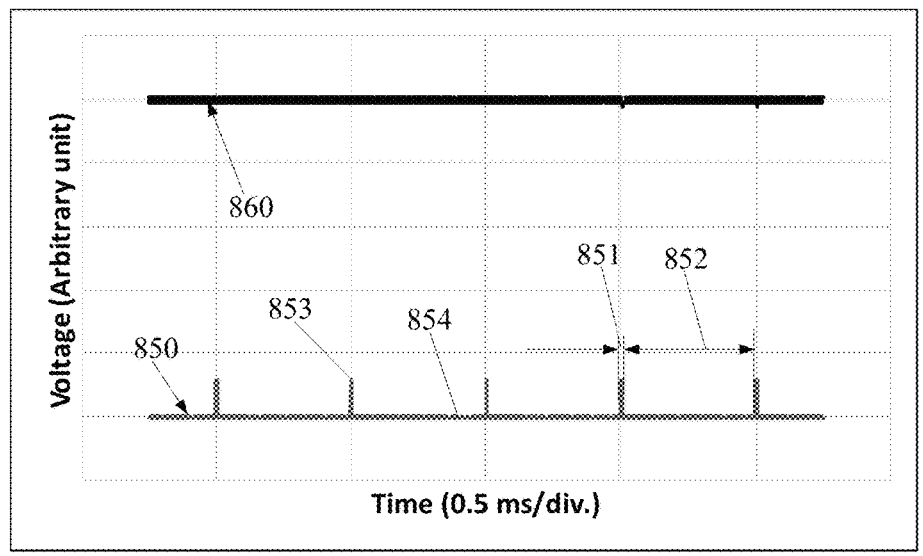
FIG. 6 is another example of a second PWM signal and an output voltage waveform according to the present disclosure.

FIG. 6 is another example of a second PWM signal and an output voltage waveform according to the present disclosure. In FIG. 6, the second PWM signal 850 comprises multiple pulses with an amplitude 853 representing a high level "1" and a zero amplitude 854 representing a low level "0". The amplitude 853 comprises an on-period 851 of 0.005 ms whereas the zero amplitude 854 comprises an off-period 852 of 0.495 ms. In this case, a duty cycle is 0-1%. An output voltage versus time from the photo-transistor 512 (FIG. 1) is shown in a waveform 860. As can be seen, the waveform 860 is basically maintains in a second voltage level that is high enough to prohibit the first voltage converter circuit 400 to operate because a difference of the first DC voltage and the second voltage level is less than either the first forward voltage or the second forward voltage. The first voltage converter circuit 400 provides a zero total current to drive both the first set of one or more LED arrays 210 and the second set of one or more LED arrays 220.

Figure 7:
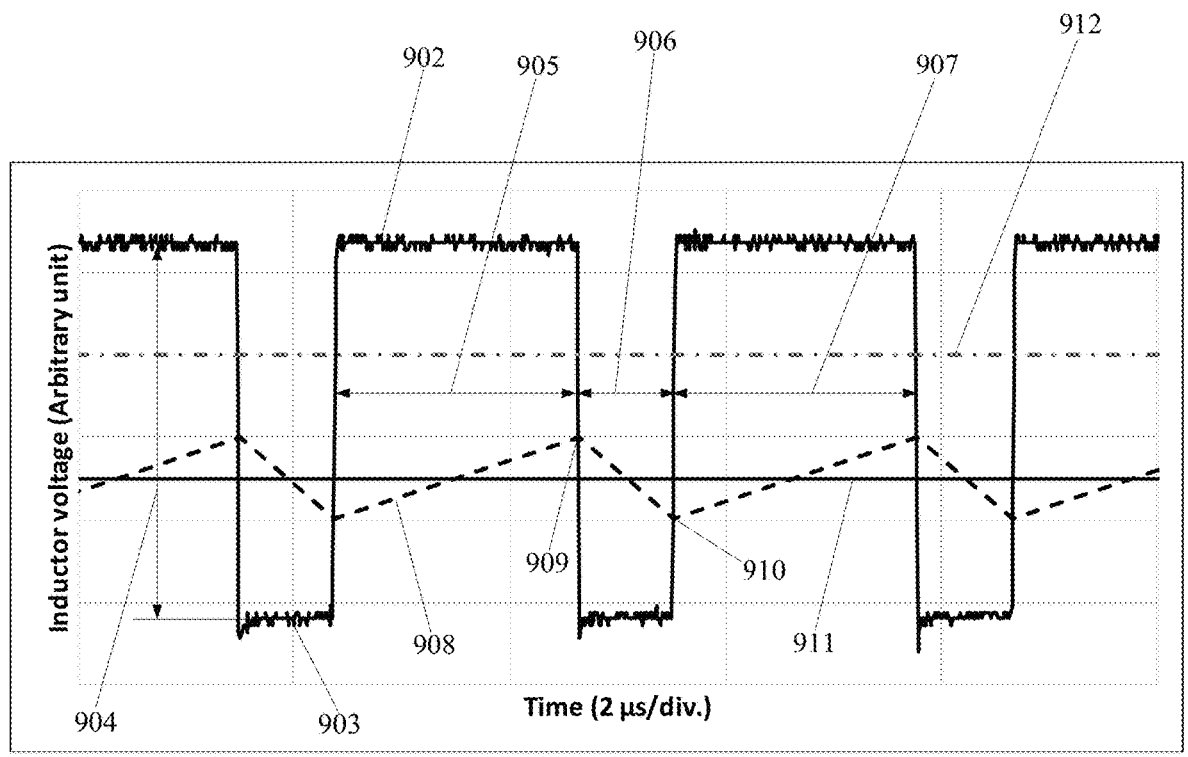
FIG. 7 is an example of inductor voltage and current waveforms according to the present disclosure.

FIG. 7 is an example of inductor voltage and current waveforms according to the present disclosure. Referring to FIGS. 1-2, when 120 V (volt)/60 Hz of the AC mains is applied, the power converter circuit 300 outputs the first DC voltage. The first voltage converter circuit 400 then converts the first DC voltage into the second DC voltage, which is lower than the first DC voltage. According to design configurations, each of the first set of one or more LED arrays 210 and the second set of one or more LED arrays 220 is coupled between the first DC voltage and the second DC voltage. When the second DC voltage is built up to the predetermined level, a difference of the first DC voltage and the second DC voltage is greater than either the first forward voltage or the second forward voltage. This ensures that both the first set of one or more LED arrays 210 and the second set of one or more LED arrays 220 are forward biased and normally operated. Referring to FIG. 2, the inductor 401 is charged when the first DC voltage is applied and when the third electronic switch 403 is on. In FIG. 7, a high level 902 represents $V_{DC,1}-V_o$, with respect to a 0 V reference 912, where $V_{DC,1}$ is the first DC voltage, and $V_o$ is a desired output voltage across either the first set of one or more LED arrays 210 or the second set of one or more LED arrays 220. A low level 903 represents $-V_o$. The peak-to-peak voltage 904 between the high level 902 and the low level 903 is basically the first DC voltage. The waveform in FIG. 7 comprises multiple pulses with a first width 905 of 2.4 microseconds (µs), a second width 906 of 0.5 µs, and a third width 907 of 2.4 µs. Either the first width 905 or the third width 907 represents the constant on-time of 2.4 µs. The second width 906 then represents the varied off-time of 0.5 µs. The inductor 401 (in FIG. 2) is discharged when the third electronic switch 403 is off. As seen in FIG. 7, the inductor current 908 increases linearly with the on-time from the zero current when the inductor 401 is charged, reaching the maximum inductor current ($I_{pk}$) at the end of the on-time 909, then starting to discharge from the maximum inductor current ($I_{pk}$) during off-time. At the end of discharge cycle 910, the inductor current 908 decreases to zero, and the second control device 402 detects the zero current and turns on the third electronic switch 403 for a next charging cycle. An average inductor current 911 then represents a desired output current to operate both the first set of one or more LED arrays 210 and the second set of one or more LED arrays 220. For the $V_{DC,1}$, the on-time is fixed at 2.4 µs, whereas the off-time of the third electronic switch 403 varies as determined by the zero inductor current. In FIG. 7, the second width 906 representing the off-time period of 0.5 µs appears between the first width 905 and the third width 907. Thus, a corresponding switching frequency is 345 kHz. However, the corresponding switching frequency may slightly vary from 345 kHz because the off-time varies according to variations of the first DC voltage further due to line voltage variations. In FIG. 7, a duty cycle of 0.82 gives a desired output voltage $V_o$ with a constant output current, yielding a regulated power to operate both the first set of one or more LED arrays 210 and the second set of one or more LED arrays 220 when the first voltage converter circuit 400 is operating.

Whereas preferred embodiments of the present disclosure have been shown and described, it will be realized that alterations, modifications, and improvements may be made thereto without departing from the scope of the following claims. Another kind of schemes with an LED luminaire that incorporates remote controls for power switching, luminaire dimming, and CCT tuning or various kinds of combinations adopted to operate an LED luminaire to accomplish the same or different objectives could be easily adapted for use from the present disclosure. Accordingly, the foregoing descriptions and attached drawings are by way of example only and are not intended to be limiting.

What is claimed is:

1. A light-emitting diode (LED) luminaire, comprising:
   a power converter circuit comprising a first ground reference and a first rectifier diode, the power converter circuit coupled to alternate-current (AC) mains and configured to convert a line voltage from the AC mains into a first direct-current (DC) voltage via the first rectifier diode;
   a first voltage converter circuit configured to down-convert the first DC voltage into a second DC voltage with respect to the first ground reference;
   a plurality of LED arrays comprising a first set of one or more LED arrays with a first positive potential terminal and a first negative potential terminal;
   a first control circuit comprising a photo-coupler circuit configured to receive a first pulse-width modulation (PWM) signal and to control a first LED driving current to drive the first set of one or more LED arrays; and
   a transceiver circuit comprising a receiver and a decoder and controller, the transceiver circuit coupled to the first control circuit and configured to receive and demodulate various phase-shift keying (PSK) band-pass signals and to output the first PWM signal,
   wherein:
      the first set of one or more LED arrays is coupled to the first DC voltage at the first positive potential terminal and coupled to the second DC voltage at the first negative potential terminal; and
      the photo-coupler circuit comprises an LED and a photo-transistor, the LED configured to emit a light signal responsive to the first PWM signal, and the photo-transistor configured to receive the light signal and to enable the first voltage converter circuit.

2. The LED luminaire of claim 1, wherein the first control circuit further comprises a first electronic switch controlled by the first DC voltage and coupled to the first negative potential terminal, and wherein, when the second DC voltage is built up to a predetermined level, the first LED driving current is allowed to pass through the first electronic switch, thereby lighting up the first set of one or more LED arrays.

3. The LED luminaire of claim 2, wherein the plurality of LED arrays further comprises a second set of one or more LED arrays with a second positive potential terminal and a second negative potential terminal, wherein the second set of one or more LED arrays is coupled to the first DC voltage at the second positive potential terminal and coupled to the second DC voltage at the second negative potential terminal, wherein the first control circuit further comprises a second electronic switch controlled by the first DC voltage and coupled to the second negative potential terminal, and wherein, when the second DC voltage is built up to the predetermined level, a second LED driving current is allowed to pass through the second electronic switch, thereby lighting up the second set of one or more LED arrays.

4. The LED luminaire of claim 3, wherein the transceiver circuit is further configured to output a second PWM signal configured to control a total current allowed to flow from the first DC voltage to the second DC voltage and to continue to reach the first ground reference, and wherein a sum of the first LED driving current and the second LED driving current equals the total current.

5. The LED luminaire of claim 4, wherein the first set of one or more LED arrays and the second set of one or more LED arrays respectively comprise a plurality of cool-white LEDs and a plurality of warm-white LEDs, and wherein a ratio of the first LED driving current to the second LED driving current determines a correlated color temperature of luminous flux emitted from the LED luminaire.

6. The LED luminaire of claim 5, wherein the first voltage converter circuit comprises an inductor, a second control circuit, an output capacitor, and a third electronic switch coupled to the inductor and controlled by the second control circuit, and wherein the second control circuit is controlled by the second PWM signal to turn on and off the third electronic switch and to regulate the second DC voltage and the total current.

7. The LED luminaire of claim 6, wherein the first control circuit further comprises a resistor coupled to the first DC voltage and a diode coupled to the inductor with a diode current direction toward the first DC voltage, wherein the resistor is configured to charge the inductor in a start-up process, and wherein the diode is configured to conduct to sustain a discharging current from the inductor to both the first set of one or more LED arrays and the second set of one or more LED arrays when the third electronic switch is turned off.

8. The LED luminaire of claim 7, wherein, responsive to detecting zero current in the inductor, the second control circuit is configured to generate a zero current detection signal to control the third electronic switch on and off with a constant on-time and a varied off-time with a duty cycle controlling both the first LED driving current and the second LED driving current to respectively drive the first set of one or more LED arrays and the second set of one or more LED arrays.

9. The LED luminaire of claim 8, wherein the first electronic switch, the second electronic switch, and the third electronic switch comprise a metal-oxide-semiconductor field-effect transistor (MOSFET).

10. The LED luminaire of claim 1, wherein the power converter circuit further comprises a second rectifier diode, a second voltage converter circuit, and a transformer comprising a secondary winding and a tap, and wherein the second rectifier diode is coupled to the tap and configured to convert energy pulses generated in the transformer into a third DC voltage.

11. The LED luminaire of claim 10, wherein the second voltage converter circuit comprises a low-dropout regulator coupled to receive the third DC voltage and configured to convert the third DC voltage into a fourth DC voltage to power up the transceiver circuit.

12. The LED luminaire of claim 1, wherein the decoder and controller comprises a microcontroller, a microchip, or a programmable logic controller.

13. The LED luminaire of claim 1, further comprising:
a remote controller comprising a remote user interface and a transmitter circuit, the remote controller configured to send the PSK band-pass signals to the transceiver circuit in response to a plurality of signals from the remote user interface, wherein the transmitter circuit comprises a transmitter and an encoder and controller coupled between the remote user interface and the transmitter and configured to convert the plurality of signals into a plurality of sets of binary data characters, and wherein each of the plurality of sets of binary data characters comprises command data.

14. The LED luminaire of claim 13, wherein the remote user interface comprises a plurality of touch-sensitive switches configured to generate the plurality of signals.

15. The LED luminaire of claim 13, wherein each of the touch-sensitive switches comprises an input and an output respectively configured to receive a voltage and to send a pulse signal from and to the encoder and controller when an associated touch-sensitive switch is touched.

16. The LED luminaire of claim 13, wherein at least two of the plurality of signals are respectively configured to turn on and off the second DC voltage.

17. The LED luminaire of claim 13, wherein at least two of the plurality of signals are respectively configured to dim up and to dim down both the first set of one or more LED arrays and the second set of one or more LED arrays.

18. The LED luminaire of claim 13, wherein at least two of the plurality of signals are respectively configured to increase and to decrease a correlated color temperature of luminous flux emitted from the LED luminaire.

* * * * *